(12) United States Patent
Shinoi

(10) Patent No.: US 7,502,593 B2
(45) Date of Patent: Mar. 10, 2009

(54) RADIO COMMUNICATION SYSTEM

(75) Inventor: Kenichiro Shinoi, Yokohama (JP)

(73) Assignee: Panasonic Corporation, Osaka (JP)

( * ) Notice: Subject to any disclaimer, the term of this patent is extended or adjusted under 35 U.S.C. 154(b) by 428 days.

(21) Appl. No.: 10/521,243

(22) PCT Filed: Apr. 26, 2004

(86) PCT No.: PCT/JP2004/005993

§ 371 (c)(1),
(2), (4) Date: Oct. 5, 2005

(87) PCT Pub. No.: WO2004/098227

PCT Pub. Date: Nov. 11, 2004

(65) Prior Publication Data

US 2006/0166665 A1 Jul. 27, 2006

(30) Foreign Application Priority Data

Apr. 25, 2003 (JP) ............................. 2003-122544

(51) Int. Cl.
*H04B 17/00* (2006.01)
(52) U.S. Cl. ................. 455/67.11; 455/426.1; 370/252; 370/328
(58) Field of Classification Search ............. 455/67.11, 455/426.1; 370/252, 328, 465
See application file for complete search history.

(56) References Cited

U.S. PATENT DOCUMENTS

| | | | | |
|---|---|---|---|---|
| 6,067,458 A * | 5/2000 | Chen | ................... | 455/522 |
| 6,119,010 A | 9/2000 | Labedz | | |
| 7,050,761 B2 * | 5/2006 | Hamabe | ................ | 455/69 |
| 2002/0147015 A1 * | 10/2002 | Hamabe | ................ | 455/442 |

| | | | | |
|---|---|---|---|---|
| 2003/0073409 A1 * | 4/2003 | Nobukiyo et al. | .......... | 455/67.1 |

FOREIGN PATENT DOCUMENTS

EP    1204219    5/2002

(Continued)

OTHER PUBLICATIONS

Japanese Office Action with English translation for Japanese Patent Application No. 2003-122544 dated Jul. 17, 2007.

(Continued)

*Primary Examiner*—Nay A Maung
*Assistant Examiner*—Tuan H Nguyen
(74) *Attorney, Agent, or Firm*—Dickinson Wright, PLLC

(57) ABSTRACT

A mobile station apparatus 101-1 detects and reports a reception quality value of a known signal transmitted from a base station apparatus 102-1. Base station apparatus 102-1 has a quality deficiency signal generation section 1021 that compares the reception quality value with a predetermined threshold value and generates a quality deficiency signal when it is shown that the reception quality value is less than the predetermined threshold value, and a quality deficiency signal reporting section 1024 that reports an identifier of mobile station apparatus 101-1 corresponding to the quality deficiency signal to a base station control apparatus 103. Base station control apparatus 103 has a control signal transmitting section 1031 that transmits a control signal to switch data transmission by means of HSDPA for mobile station apparatus 101-1 to data transmission by means of DPCH.

3 Claims, 8 Drawing Sheets

EXAMPLES OF CQI VALUES

| CQI VALUE | TRANSPORT BLOCK SIZE | NUMBER OF HS-PDSCH | MODULATION |
|---|---|---|---|
| 0 | 0 | 0 | No |
| 1 | 137 | 1 | QPSK |
| 2 | 173 | 1 | QPSK |
| 3 | 233 | 1 | QPSK |
| 4 | 317 | 1 | QPSK |
| 5 | 377 | 1 | QPSK |
| 6 | 461 | 1 | QPSK |
| 7 | 650 | 2 | QPSK |
| 8 | 792 | 2 | QPSK |
| 9 | 931 | 2 | QPSK |
| 10 | 1262 | 3 | QPSK |
| 11 | 1483 | 3 | QPSK |
| 12 | 1742 | 3 | QPSK |
| 13 | 2279 | 4 | QPSK |
| 14 | 2583 | 4 | QPSK |
| 15 | 3319 | 5 | QPSK |
| 16 | 3365 | 5 | 16-QAM |
| 17 | 4189 | 5 | 16-QAM |
| 18 | 4664 | 5 | 16-QAM |
| 19 | 5287 | 5 | 16-QAM |
| 20 | 5887 | 5 | 16-QAM |
| 21 | 6554 | 5 | 16-QAM |

POOR PROPAGATION PATH CONDITIONS
↓
GOOD PROPAGATION PATH CONDITIONS

FOREIGN PATENT DOCUMENTS

| | | |
|---|---|---|
| EP | 1209859 | 5/2002 |
| JP | 2002-232943 | 8/2002 |
| JP | 2002-262349 | 9/2002 |
| KR | 2000-0010070 | 2/2000 |
| KR | 2001-0080124 | 8/2001 |
| KR | 2002-0035669 | 5/2002 |

OTHER PUBLICATIONS

Korean Office Action with English translation dated Nov. 9, 2006.
PCT International Search Report dated Aug. 17, 2004.

* cited by examiner

EXAMPLES OF CQI VALUES

| CQI VALUE | TRANSPORT BLOCK SIZE | NUMBER OF HS-PDSCH | MODULATION |
|---|---|---|---|
| 0 | 0 | 0 | No |
| 1 | 137 | 1 | QPSK |
| 2 | 173 | 1 | QPSK |
| 3 | 233 | 1 | QPSK |
| 4 | 317 | 1 | QPSK |
| 5 | 377 | 1 | QPSK |
| 6 | 461 | 1 | QPSK |
| 7 | 650 | 2 | QPSK |
| 8 | 792 | 2 | QPSK |
| 9 | 931 | 2 | QPSK |
| 10 | 1262 | 3 | QPSK |
| 11 | 1483 | 3 | QPSK |
| 12 | 1742 | 3 | QPSK |
| 13 | 2279 | 4 | QPSK |
| 14 | 2583 | 4 | QPSK |
| 15 | 3319 | 5 | QPSK |
| 16 | 3365 | 5 | 16-QAM |
| 17 | 4189 | 5 | 16-QAM |
| 18 | 4664 | 5 | 16-QAM |
| 19 | 5287 | 5 | 16-QAM |
| 20 | 5887 | 5 | 16-QAM |
| 21 | 6554 | 5 | 16-QAM |

POOR PROPAGATION PATH CONDITIONS → GOOD PROPAGATION PATH CONDITIONS

FIG.1

RADIO COMMUNICATION SYSTEM

TECHNICAL FIELD

The present invention relates to a radio communication system that has mobile station apparatuses, base station apparatuses, and a base station control apparatus, and uses an adaptive modulation method.

BACKGROUND ART

Heretofore, in a radio communication system that uses the WCDMA (Wideband Code Division Multiple Access) method, progress has been made in standardizing a technology that performs packet extension called HSDPA (High Speed Downlink Packet Access). In this radio communication system, communication is performed on conventional WCDMA channels called DPCH (Dedicated downlink Physical channels) while outbound reception of a high-speed channel called an HSDSCH channel (High Speed Downlink Shared Channel) is simultaneously performed in parallel.

In this HSDSCH channel, a technology called adaptive modulation is used whereby the modulation method and coding rate are changed in accordance with propagation path conditions, and each mobile station apparatus notifies a base station apparatus of propagation path conditions by sending an outbound pilot channel reception condition report called a CQI (Channel Quality Indicator) report.

FIG. 1 is a drawing for explaining CQI values that indicate propagation path quality. An example is illustrated in which 22 levels of CQI value are used, corresponding to CQI values 0 through 21. In this case, a mobile station apparatus reports a low CQI value to a base station apparatus when it determines that propagation path conditions are poor, and reports a high CQI value to a base station apparatus when it determines that propagation path conditions are good. A CQI value of 0 is reported by a mobile station apparatus when the base signal reception level does not reach a predetermined threshold value (i.e. when out of range).

A base station apparatus determines a mobile station apparatus to be made a transmission target based on the CQI values reported by each mobile station apparatus, and sends control information such as the modulation method, number of multiplex codes, and number of information bits, to that mobile station apparatus by means of HS-SCCH (High Speed Shared Control Channel). A mobile station apparatus receives the HS-SCCH and determines whether or not there is transmission addressed to itself, and if it determines that transmission is addressed to itself, demodulates and decodes data using information conveyed in the control information.

An example of a conventional radio communication system that uses this kind of adaptive modulation method in a code division multiple access system is a method whereby data for transmission is duplicated for a mobile station apparatus in the vicinity of a cell boundary, and duplicated identical data is transmitted spread with a plurality of codes and multiplexed, as disclosed in Unexamined Japanese Patent Publication No. 2002-232943, for example.

However, in the conventional radio communication system disclosed in Unexamined Japanese Patent Publication No. 2002-232943, there are problems in that, if mobile terminal apparatuses supporting HSDPA are widely distributed in the area covered by a base station apparatus when the base station apparatus compensates for minimum throughput for all mobile station apparatuses using HSDPA, the time for assigning HSDPA to a mobile station apparatus far from the base station apparatus becomes lengthy, and as a result, overall system throughput falls, and also, even though the HSDPA time period assigned to a mobile station apparatus in the vicinity of a cell edge is small, that mobile station apparatus must send a CQI value periodically, and therefore, since that mobile station apparatus is far from the base station apparatus, there is a significant waste of power.

On the other hand, a problem with the above-described conventional radio communication system is that, since the HS-SCCH, the physical channel that carries control signals including the modulation method, information bit length, and number of multiplex codes to a mobile station apparatus that is the object of data transmission is a transmission from a single base station apparatus, as with HSDPA, there is no soft handover, and therefore extremely high power must be used for transmission from a base station apparatus to a distant mobile station apparatus at the cell edge, so that, when a base station apparatus frequently assigns HSDPA to a mobile station apparatus at the cell edge, the proportion of total transmission power accounted for by control channel power is high, and consequently overall system throughput is poor.

DISCLOSURE OF INVENTION

It is an object of the present invention to provide a radio communication system that enables overall system throughput to be improved by controlling HSDPA assignment to a plurality of mobile station apparatuses.

According to one mode of the present invention, a radio communication system has a mobile station apparatus, a base station apparatus that performs data transmission to and reception from the mobile station apparatus by means of radio communication, and a base station control apparatus that controls the base station apparatus; the mobile station apparatus has a reception quality value detection section that detects a reception quality value of a transmit signal transmitted from the base station apparatus, and a reception quality value reporting section that reports the reception quality value to the base station apparatus; the base station apparatus has a section that performs data transmission for the mobile station apparatus by means of HSDPA, a section that performs data transmission by means of DPCH, quality deficiency signal generation section that generates a quality deficiency signal when the reception quality value is shown to be smaller than a predetermined threshold value, and a quality deficiency signal reporting section that reports the quality deficiency signal to the base station control apparatus; the base station control apparatus has a control signal transmitting section that transmits a control signal to the base station apparatus so that data transmission for the mobile station apparatus is switched from HSDPA to DPCH based on the quality deficiency signal; and the base station apparatus has a section that switches data transmission for the mobile station apparatus from HSDPA to DPCH based on the control signal.

According to another mode of the present invention, a radio communication system has a mobile station apparatus, a base station apparatus that performs data transmission to and reception from the mobile station apparatus by means of radio communication, and a base station control apparatus that controls the base station apparatus; the mobile station apparatus has a reception quality value detection section that detects a reception quality value of a transmit signal transmitted from the base station apparatus, a reception quality comparison section that compares the reception quality value with a predetermined threshold value and generates a reception quality comparison result, and a reception quality comparison result reporting section that reports the reception quality comparison result to the base station apparatus; the base station apparatus has a section that performs data transmission for the mobile station apparatus by means of HSDPA, a section that performs data transmission for the mobile station apparatus by means of DPCH, a quality deficiency detection section that detects the fact that the reception quality value is shown to be smaller than the predetermined threshold value by the reception quality comparison result and generates a quality deficiency signal, and a quality deficiency signal reporting section that reports the quality deficiency signal to the base station control apparatus; the base station control apparatus has a control signal transmitting section that transmits a control signal to the base station apparatus so that data transmission for the mobile station apparatus is switched from HSDPA to DPCH based on the quality deficiency signal; and the base station apparatus has a section that switches data transmission for the mobile station apparatus from HSDPA to DPCH based on the control signal.

According to yet another mode of the present invention, a radio communication system has a mobile station apparatus, a base station apparatus that performs data transmission to and reception from the mobile station apparatus by means of radio communication, and a base station control apparatus that controls the base station apparatus; the mobile station apparatus has a reception quality value detection section that detects a reception quality value of a transmit signal transmitted from the base station apparatus, a reception quality comparison section that compares the reception quality value with a predetermined threshold value and generates a reception quality comparison result, and a reception quality comparison result reporting section that reports the reception quality comparison result to the base station apparatus; the base station apparatus has a quality deficiency signal generation section that generates a quality deficiency signal when the reception quality value is shown to be smaller than the predetermined threshold value by the reception quality comparison result, a quality deficiency signal reporting section that reports the quality deficiency signal to the base station control apparatus, and a section that adds and transmits secondary CPICH with a shorter range than primary CPICH; the base station control apparatus has a control signal transmitting section that transmits a control signal to the base station apparatus so that the secondary CPICH is added and transmitted based on the quality deficiency signal; and the base station apparatus has a section that adds and transmits the secondary CPICH based on the control signal.

According to yet another mode of the present invention, a radio communication system has a mobile station apparatus, a base station apparatus that performs data transmission to and reception from the mobile station apparatus by means of radio communication, and a base station control apparatus that controls the base station apparatus; the mobile station apparatus has a reception quality value detection section that detects a reception quality value of a transmit signal transmitted from the base station apparatus, a quality deficiency signal generation section that compares the reception quality value with a predetermined threshold value and generates a quality deficiency signal when the reception quality value is smaller than the predetermined threshold value, and a quality deficiency determination signal reporting section that measures the number of quality deficiency signal generation times, which is the number of times that the quality deficiency signal is generated per unit time, and when the number of quality deficiency signal generation times is greater than or equal to a predetermined number of times, generates a quality deficiency determination signal and reports that quality deficiency determination signal to the base station apparatus; the base station apparatus has a section that performs data transmission for the mobile station apparatus by means of HSDPA, a section that performs data transmission for the mobile station apparatus by means of DPCH, a quality deficiency determination detection section that detects the fact that the quality deficiency determination signal has been received and generates a quality deficiency signal, and a quality deficiency signal reporting section that reports the quality deficiency signal to the base station control apparatus; the base station control apparatus has a control signal transmitting section that transmits a control signal to the base station apparatus so that data transmission for the mobile station apparatus is switched from HSDPA to DPCH based on the quality deficiency signal; and the base station apparatus has a section that switches data transmission for the mobile station apparatus from HSDPA to DPCH based on the control signal.

According to yet another mode of the present invention, a radio communication system has a mobile station apparatus, a base station apparatus that performs data transmission to and reception from the mobile station apparatus by means of radio communication, and a base station control apparatus that controls the base station apparatus; the mobile station apparatus has a reception quality value detection section that detects a reception quality value of a transmit signal transmitted from the base station apparatus, and a reception quality value reporting section that reports the reception quality value to the base station apparatus; the base station apparatus has a section that performs data transmission for the mobile station apparatus by means of HSDPA, a section that performs data transmission by means of DPCH, a quality deficiency signal generation section that compares the reception quality value with a predetermined threshold value and generates a quality deficiency signal when the reception quality value is smaller than the predetermined threshold value, and a quality deficiency signal reporting section that reports the quality deficiency signal to the base station control apparatus; the base station control apparatus has a control signal transmitting section that measures the number of quality deficiency signal generation times, which is the number of times that the quality deficiency signal is generated per unit time, and when the number of quality deficiency signal generation times is greater than or equal to a predetermined number of times, transmits a control signal to the base station apparatus so that data transmission for the mobile station apparatus is switched from HSDPA to DPCH; and the base station apparatus has a section that switches data transmission for the mobile station apparatus from HSDPA to DPCH based on the control signal.

According to yet another mode of the present invention, a radio communication system has a mobile station apparatus, a base station apparatus that performs data transmission to and reception from the mobile station apparatus by means of radio communication, and a base station control apparatus that controls the base station apparatus; the mobile station apparatus has a reception quality value detection section that detects a reception quality value of a transmit signal transmitted from the base station apparatus, and a reception quality value reporting section that reports the reception quality value to the base station apparatus; the base station apparatus has a section that performs data transmission for the mobile station apparatus by means of HSDPA, a section that performs data transmission by means of DPCH, a quality deficiency signal generation section that compares the reception quality value with a predetermined threshold value and generates a quality deficiency signal when the reception quality value is smaller than the predetermined threshold value, and a quality deficiency determination signal reporting section that measures the number of quality deficiency signal generation times, which is the number of times that the quality deficiency signal is generated per unit time, and when the number of quality deficiency signal generation times is greater than or equal to a predetermined number of times, generates a quality deficiency determination signal and reports that quality deficiency determination signal to the base station control apparatus; the base station control apparatus has a control signal transmitting section that transmits a control signal to the base station apparatus so that data transmission for the mobile station apparatus is switched from HSDPA to DPCH based on the quality deficiency determination signal; and the base station apparatus has a section that switches data transmission for the mobile station apparatus from HSDPA to DPCH based on the control signal.

According to yet another mode of the present invention, a base station apparatus is the base station apparatus in a radio communication system that has a mobile station apparatus, a base station apparatus that performs data transmission to and reception from the mobile station apparatus by means of radio communication, and a base station control apparatus that controls the base station apparatus, and wherein the mobile station apparatus has a reception quality value detection section that detects a reception quality value of a transmit signal transmitted from the base station apparatus, and a reception quality value reporting section that reports the reception quality value to the base station apparatus, and the base station control apparatus has a control signal transmitting section that transmits a control signal to the base station apparatus so that data transmission for the mobile station apparatus is switched from HSDPA to DPCH based on a quality deficiency signal; and this base station apparatus has a section that performs data transmission for the mobile station apparatus by means of HSDPA, a section that performs data transmission by means of DPCH, a quality deficiency signal generation section that generates the quality deficiency signal when the reception quality value is shown to be smaller than a predetermined threshold value, a quality deficiency signal reporting section that reports the quality deficiency signal to the base station control apparatus, and a section that switches data transmission for the mobile station apparatus from HSDPA to DPCH based on the control signal from the base station control apparatus.

According to yet another mode of the present invention, a base station control apparatus is the base station control apparatus in a radio communication system that has a mobile station apparatus, a base station apparatus that performs data transmission to and reception from the mobile station apparatus by means of radio communication, and a base station control apparatus that controls the base station apparatus, and wherein the mobile station apparatus has a reception quality value detection section that detects a reception quality value of a transmit signal transmitted from the base station apparatus, and a reception quality value reporting section that reports the reception quality value to the base station apparatus, and the base station apparatus has a section that performs data transmission for the mobile station apparatus by means of HSDPA, a section that performs data transmission by means of DPCH, a quality deficiency signal generation section that generates the quality deficiency signal when the reception quality value is shown to be smaller than a predetermined threshold value, a quality deficiency signal reporting section that reports the quality deficiency signal to the base station control apparatus, and a section that switches data transmission for the mobile station apparatus from HSDPA to DPCH based on a control signal from the base station control apparatus; and this base station control apparatus has a control signal transmitting section that transmits a control signal to the base station apparatus so that data transmission for the mobile station apparatus is switched from HSDPA to DPCH based on the quality deficiency signal.

According to yet another mode of the present invention, a base station apparatus is the base station apparatus in a radio communication system that has a mobile station apparatus, a base station apparatus that performs data transmission to and reception from the mobile station apparatus by means of radio communication, and a base station control apparatus that controls the base station apparatus, and wherein the mobile station apparatus has a reception quality value detection section that detects a reception quality value of a transmit signal transmitted from the base station apparatus, a reception quality comparison section that compares the reception quality value with a predetermined threshold value and generates a reception quality comparison result, and a reception quality comparison result reporting section that reports the reception quality comparison result to the base station apparatus, and the base station control apparatus has a control signal transmitting section that transmits a control signal to the base station apparatus so that data transmission for the mobile station apparatus is switched from HSDPA to DPCH based on a quality deficiency signal from the base station apparatus; and this base station apparatus has a section that performs data transmission for the mobile station apparatus by means of HSDPA, a section that performs data transmission for the mobile station apparatus by means of DPCH, a quality deficiency detection section that detects the fact that the reception quality value is shown to be smaller than the predetermined threshold value by the reception quality comparison result and generates the quality deficiency signal, a quality deficiency signal reporting section that reports the quality deficiency signal to the base station control apparatus, and a section that switches data transmission for the mobile station apparatus from HSDPA to DPCH based on the control signal from the base station control apparatus.

According to yet another mode of the present invention, a base station control apparatus is the base station control apparatus in a radio communication system that has a mobile station apparatus, a base station apparatus that performs data transmission to and reception from the mobile station apparatus by means of radio communication, and a base station control apparatus that controls the base station apparatus, and wherein the mobile station apparatus has a reception quality value detection section that detects a reception quality value of a transmit signal transmitted from the base station apparatus, a reception quality comparison section that compares the reception quality value with a predetermined threshold value and generates a reception quality comparison result, and a reception quality comparison result reporting section that reports the reception quality comparison result to the base station apparatus, and the base station apparatus has a section that performs data transmission for the mobile station apparatus by means of HSDPA, a section that performs data transmission for the mobile station apparatus by means of DPCH, a quality deficiency detection section that detects the fact that the reception quality value is shown to be smaller than the predetermined threshold value by the reception quality comparison result and generates a quality deficiency signal, a quality deficiency signal reporting section that reports the quality deficiency signal to the base station control apparatus, and a section that switches data transmission for the mobile station apparatus from HSDPA to DPCH based on a control signal from the base station control apparatus; and this base station control apparatus has a control signal transmitting section that transmits the control signal to the base station apparatus so that data transmission for the mobile station apparatus is switched from HSDPA to DPCH based on the quality deficiency signal.

According to yet another mode of the present invention, a base station apparatus is the base station apparatus in a radio communication system that has a mobile station apparatus, a base station apparatus that performs data transmission to and reception from the mobile station apparatus by means of radio communication, and a base station control apparatus that controls the base station apparatus, and wherein the mobile station apparatus has a reception quality value detection section that detects a reception quality value of a transmit signal transmitted from the base station apparatus, a reception quality comparison section that compares the reception quality value with a predetermined threshold value and generates a reception quality comparison result, and a reception quality comparison result reporting section that reports the reception quality comparison result to the base station apparatus, and the base station control apparatus has a control signal transmitting section that transmits a control signal to the base station apparatus so that secondary CPICH is added and transmitted based on a quality deficiency signal from the base station apparatus; and this base station apparatus has a quality deficiency signal generation section that generates the quality deficiency signal when the reception quality value is shown to be smaller than the predetermined threshold value by the reception quality comparison result, a quality deficiency signal reporting section that reports the quality deficiency signal to the base station control apparatus, a section that adds and transmits secondary CPICH with a shorter range than the primary CPICH, and a section that adds and transmits the secondary CPICH based on the control signal from the base station control apparatus.

According to yet another mode of the present invention, a base station control apparatus is the base station control apparatus in a radio communication system that has a mobile station apparatus, a base station apparatus that performs data transmission to and reception from the mobile station apparatus by means of radio communication, and a base station control apparatus that controls the base station apparatus, and wherein the mobile station apparatus has a reception quality value detection section that detects a reception quality value of a transmit signal transmitted from the base station apparatus, a reception quality comparison section that compares the reception quality value with a predetermined threshold value and generates a reception quality comparison result, and a reception quality comparison result reporting section that reports the reception quality comparison result to the base station apparatus, and the base station apparatus has a quality deficiency signal generation section that generates a quality deficiency signal when the reception quality value is shown to be smaller than the predetermined threshold value by the reception quality comparison result, a quality deficiency signal reporting section that reports the quality deficiency signal to the base station control apparatus, a section that adds and transmits secondary CPICH with a shorter range than primary CPICH, and a section that adds and transmits the secondary CPICH based on a control signal from the base station control apparatus; and this base station control apparatus has a control signal transmitting section that transmits a control signal to the base station apparatus so that the secondary CPICH is added and transmitted based on the quality deficiency signal.

According to yet another mode of the present invention, a base station apparatus is the base station apparatus in a radio communication system that has a mobile station apparatus, a base station apparatus that performs data transmission to and reception from the mobile station apparatus by means of radio communication, and a base station control apparatus that controls the base station apparatus, and wherein the mobile station apparatus has a reception quality value detection section that detects a reception quality value of a transmit signal transmitted from the base station apparatus, a quality deficiency signal generation section that compares the reception quality value with a predetermined threshold value and generates a quality deficiency signal when the reception quality value is smaller than the predetermined threshold value, and a quality deficiency determination signal reporting section that measures the number of quality deficiency signal generation times, which is the number of times that the quality deficiency signal is generated per unit time, and when the number of quality deficiency signal generation times is greater than or equal to a predetermined number of times, generates a quality deficiency determination signal and reports that quality deficiency determination signal to the base station apparatus, and the base station control apparatus has a control signal transmitting section that transmits a control signal to the base station apparatus so that data transmission for the mobile station apparatus is switched from HSDPA to DPCH based on a quality deficiency signal from the base station apparatus; and this base station apparatus has a section that performs data transmission for the mobile station apparatus by means of HSDPA, a section that performs data transmission for the mobile station apparatus by means of DPCH, a quality deficiency determination detection section that detects the fact that the quality deficiency determination signal has been received and generates a quality deficiency signal, a quality deficiency signal reporting section that reports the quality deficiency signal to the base station control apparatus, and a section that switches data transmission for the mobile station apparatus from HSDPA to DPCH based on the control signal from the base station control apparatus.

According to yet another mode of the present invention, a base station control apparatus is the base station control apparatus in a radio communication system that has a mobile station apparatus, a base station apparatus that performs data transmission to and reception from the mobile station apparatus by means of radio communication, and a base station control apparatus that controls the base station apparatus, and wherein the mobile station apparatus has a reception quality value detection section that detects a reception quality value of a transmit signal transmitted from the base station apparatus, a quality deficiency signal generation section that compares the reception quality value with a predetermined threshold value and generates a quality deficiency signal when the reception quality value is smaller than the predetermined threshold value, and a quality deficiency determination signal reporting section that measures the number of quality deficiency signal generation times, which is the number of times that the quality deficiency signal is generated per unit time, and when the number of quality deficiency signal generation times is greater than or equal to a predetermined number of times, generates a quality deficiency determination signal and reports that quality deficiency determination signal to the base station apparatus, and the base station apparatus has a section that performs data transmission for the mobile station apparatus by means of HSDPA, a section that performs data transmission for the mobile station apparatus by means of DPCH, a quality deficiency determination detection section that detects the fact that the quality deficiency determination signal has been received and generates a quality deficiency signal, a quality deficiency signal reporting section that reports the quality deficiency signal to the base station control apparatus, and a section that switches data transmission for the mobile station apparatus from HSDPA to DPCH based on a control signal from the base station control apparatus; and this base station control apparatus has a control signal transmitting section that transmits a control signal to the base station apparatus so that data transmission for the mobile station apparatus is switched from HSDPA to DPCH based on the quality deficiency signal from the base station apparatus.

According to yet another mode of the present invention, a base station apparatus is the base station apparatus in a radio communication system that has a mobile station apparatus, a base station apparatus that performs data transmission to and reception from the mobile station apparatus by means of radio communication, and a base station control apparatus that controls the base station apparatus, and wherein the mobile station apparatus has a reception quality value detection section that detects a reception quality value of a transmit signal transmitted from the base station apparatus, and a reception quality value reporting section that reports the reception quality value to the base station apparatus, and the base station control apparatus has a control signal transmitting section that measures the number of quality deficiency signal generation times, which is the number of times that the quality deficiency signal is generated per unit time, and when the number of quality deficiency signal generation times is greater than or equal to a predetermined number of times, transmits a control signal to the base station apparatus so that data transmission for the mobile station apparatus is switched from HSDPA to DPCH; and this base station apparatus has a section that performs data transmission for the mobile station apparatus by means of HSDPA, a section that performs data transmission by means of DPCH, a quality deficiency signal generation section that compares the reception quality value with a predetermined threshold value and generates a quality deficiency signal when the reception quality value is smaller than the predetermined threshold value, a quality deficiency signal reporting section that reports the quality deficiency signal to the base station control apparatus, and a section that switches data transmission for the mobile station apparatus from HSDPA to DPCH based on the control signal from the base station control apparatus.

According to yet another mode of the present invention, a base station control apparatus is the base station control apparatus in a radio communication system that has a mobile station apparatus, a base station apparatus that performs data transmission to and reception from the mobile station apparatus by means of radio communication, and a base station control apparatus that controls the base station apparatus, and wherein the mobile station apparatus has a reception quality value detection section that detects a reception quality value of a transmit signal transmitted from the base station apparatus, and a reception quality value reporting section that reports the reception quality value to the base station apparatus, the base station apparatus has a section that performs data transmission for the mobile station apparatus by means of HSDPA, a section that performs data transmission by means of DPCH, a quality deficiency signal generation section that compares the reception quality value with a predetermined threshold value and generates a quality deficiency signal when the reception quality value is smaller than the predetermined threshold value, and a quality deficiency determination signal reporting section that reports the quality deficiency signal to the base station control apparatus, and the base station apparatus has a section that switches data transmission for the mobile station apparatus from HSDPA to DPCH based on a control signal from the base station control apparatus; and this base station control apparatus has a control signal transmitting section that measures the number of quality deficiency signal generation times, which is the number of times that the quality deficiency signal is generated per unit time, and when the number of quality deficiency signal generation times is greater than or equal to a predetermined number of times, transmits a control signal to the base station apparatus so that data transmission for the mobile station apparatus is switched from HSDPA to DPCH.

According to yet another mode of the present invention, a base station apparatus is the base station apparatus in a radio communication system that has a mobile station apparatus, a base station apparatus that performs data transmission to and reception from the mobile station apparatus by means of radio communication, and a base station control apparatus that controls the base station apparatus, and wherein the mobile station apparatus has a reception quality value detection section that detects a reception quality value of a transmit signal transmitted from the base station apparatus, and a reception quality value reporting section that reports the reception quality value to the base station apparatus, and the base station control apparatus has a control signal transmitting section that transmits a control signal to the base station apparatus so that data transmission for the mobile station apparatus is switched from HSDPA to DPCH based on a quality deficiency determination signal from the base station apparatus; and this base station apparatus has a section that performs data transmission for the mobile station apparatus by means of HSDPA, a section that performs data transmission by means of DPCH, a quality deficiency signal generation section that compares the reception quality value with a predetermined threshold value and generates a quality deficiency signal when the reception quality value is smaller than the predetermined threshold value, a quality deficiency determination signal reporting section that measures the number of quality deficiency signal generation times, which is the number of times that the quality deficiency signal is generated per unit time, and when the number of quality deficiency signal generation times is greater than or equal to a predetermined number of times, generates a quality deficiency determination signal and reports that quality deficiency determination signal to the base station control apparatus, and a section that switches data transmission for the mobile station apparatus from HSDPA to DPCH based on the control signal from the base station control apparatus.

According to yet another mode of the present invention, a base station control apparatus is the base station control apparatus in a radio communication system that has a mobile station apparatus, a base station apparatus that performs data transmission to and reception from the mobile station apparatus by means of radio communication, and a base station control apparatus that controls the base station apparatus, and wherein the mobile station apparatus has a reception quality value detection section that detects a reception quality value of a transmit signal transmitted from the base station apparatus, and a reception quality value reporting section that reports the reception quality value to the base station apparatus, and the base station apparatus has a section that performs data transmission for the mobile station apparatus by means of HSDPA, a section that performs data transmission by means of DPCH, a quality deficiency signal generation section that compares the reception quality value with a predetermined threshold value and generates a quality deficiency signal when the reception quality value is smaller than the predetermined threshold value, a quality deficiency determination signal reporting section that measures the number of quality deficiency signal generation times, which is the number of times that the quality deficiency signal is generated per unit time, and when the number of quality deficiency signal generation times is greater than or equal to a predetermined number of times, generates a quality deficiency determination signal and reports that quality deficiency determination signal to the base station control apparatus, and a section that switches data transmission for the mobile station apparatus from HSDPA to DPCH based on a control signal from the base station control apparatus; and this base station control apparatus has a control signal transmitting section that transmits the control signal to the base station apparatus so that data transmission for the mobile station apparatus is switched from HSDPA to DPCH based on the quality deficiency determination signal.

BRIEF DESCRIPTION OF DRAWINGS

FIG. 1 is a drawing for explaining CQI values that indicate propagation path quality;

BEST MODE FOR CARRYING OUT THE INVENTION

With reference now to the accompanying drawings, embodiments of the present invention will be explained in detail below.

Embodiment 1

Figure 2:
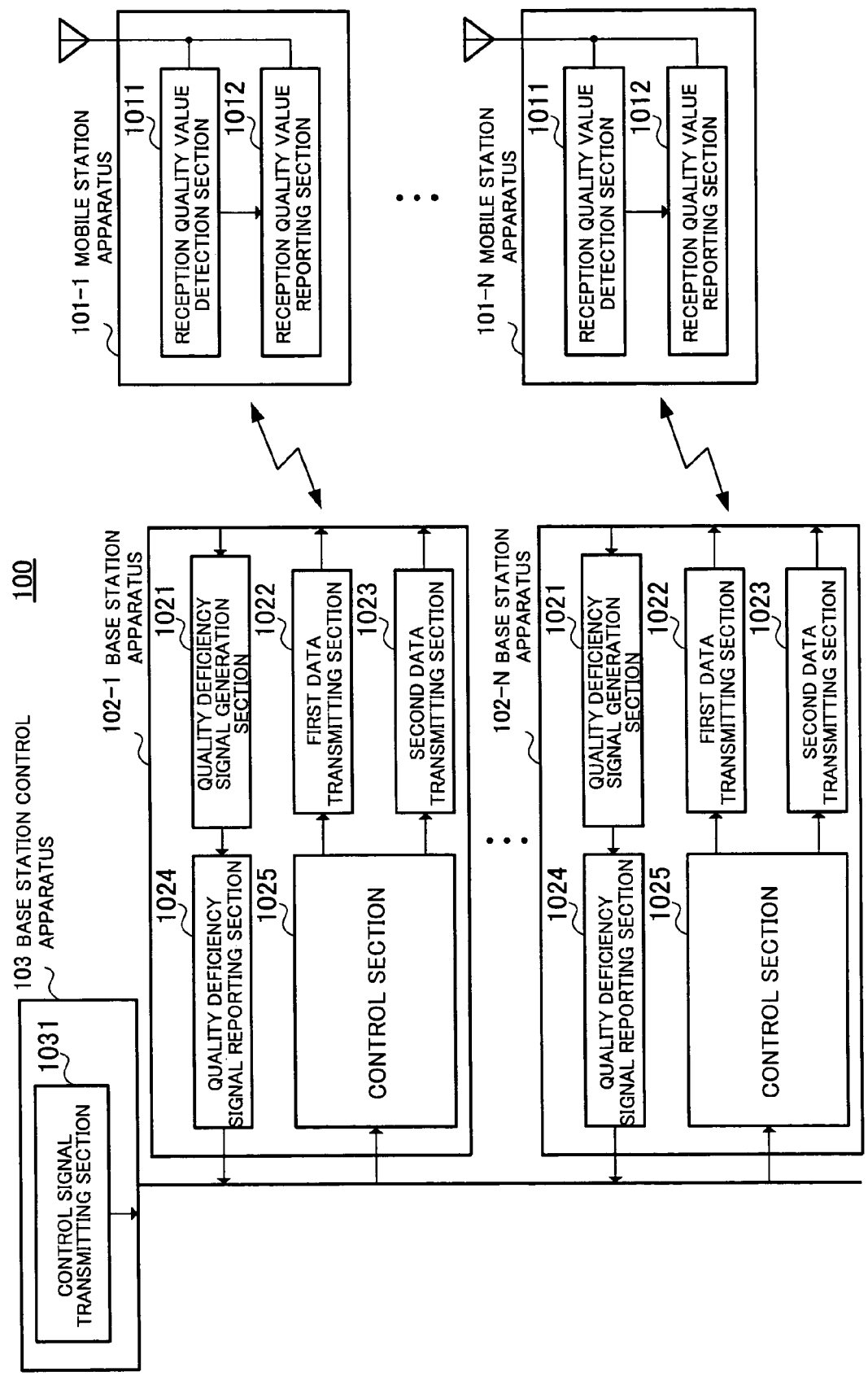
FIG. 2 is a block diagram showing the configuration of a radio communication system according to Embodiment 1 of the present invention.
Figure 3:
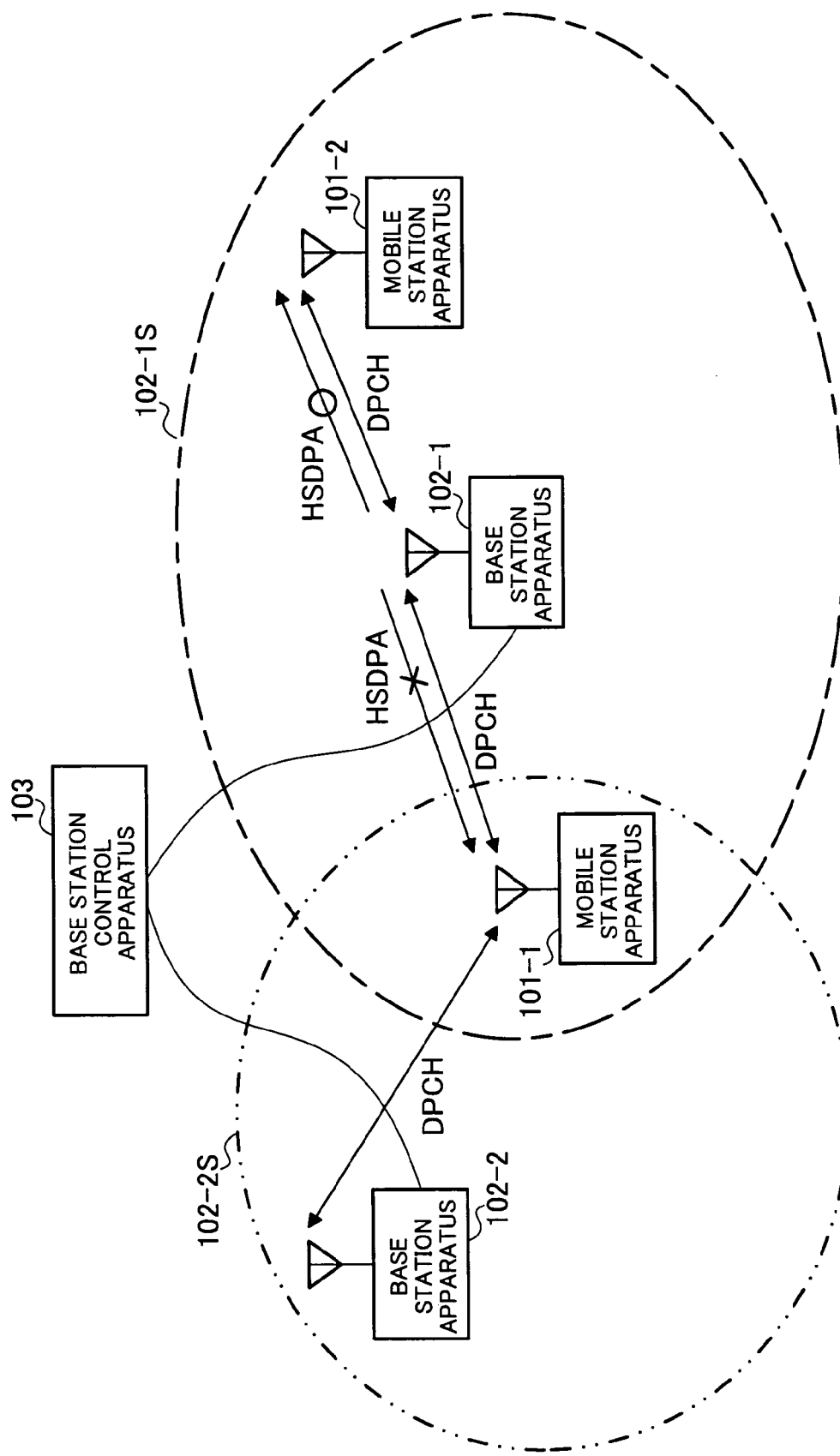
FIG. 3 is a drawing for explaining an example of the operation of a radio communication system according to Embodiment 1 of the present invention.

FIG. 2 is a block diagram showing a radio communication system according to Embodiment 1 of the present invention. FIG. 3 is a drawing for explaining an example of the operation of a radio communication system according to Embodiment 1 of the present invention.

As shown in FIG. 2, a radio communication system 100 according to Embodiment 1 of the present invention has a plurality of mobile station apparatuses 101-1 through 101-N, base station apparatuses 102-1 through 102-N that perform data transmission to and reception from these mobile station apparatuses 101-1 through 101-N by means of radio communication, and a base station control apparatus 103 that is connected to these base station apparatuses 102-1 through 102-N and controls these base station apparatuses 102-1 through 102-N.

Each of mobile station apparatuses 101-1 through 101-N has a reception quality value detection section 1011 and a reception quality value reporting section 1012. The input terminal of reception quality value reporting section 1012 is connected to the output terminal of reception quality value detection section 1011. Reception quality value detection section 1011 detects a reception quality value {for example, a CQI value (Channel Quality Indicator)} of a transmit signal transmitted from a base station apparatus 102, and conveys this reception quality value to reception quality value reporting section 1012. Each of mobile station apparatuses 101-1 through 101-N knows beforehand a base station apparatus whose data transmissions it receives by means of HSDPA, and detects and reports only the reception quality of that one corresponding base station apparatus. Reception quality value reporting section 1012 receives the reception quality value from reception quality value detection section 1011, and reports the reception quality value to the base station apparatus 102-1 through 102-N that is the HSDPA correspondent of each mobile station apparatus 101-1 through 101-N by means of radio communication.

Each of base station apparatuses 102-1 through 102-N has a quality deficiency signal generation section 1021, a first data transmitting section 1022 and second data transmitting section 1023, a quality deficiency signal reporting section 1024, and a control section 1025. Control section 1025 is connected to first data transmitting section 1022 and second data transmitting section 1023. Base station control apparatus 103 has a control signal transmitting section 1031.

Quality deficiency signal generation section 1021 receives a reception quality value from reception quality value reporting section 1012 and compares the reception quality value with a predetermined threshold value, and if the reception quality value is shown to be smaller than the predetermined threshold value, generates a quality deficiency signal and conveys this quality deficiency signal to quality deficiency signal reporting section 1024. Quality deficiency signal reporting section 1024 reports an identifier of the mobile station apparatus corresponding to the quality deficiency signal to base station control apparatus 103.

In base station control apparatus 103, when the quality deficiency signal from quality deficiency signal reporting section 1024 is received, control signal transmitting section 1031 generates a control signal to switch the data transmission method for the relevant mobile station apparatus from HSDPA to DPCH, and reports this to the base station apparatus 102 performing HSDPA transmission to the relevant mobile station apparatus.

First data transmitting section 1022 performs data transmission by means of HSDPA to one of the mobile station apparatuses for which performance of data transmission by means of HSDPA has been prescribed by control section 1025. At this time, data transmission by means of HSDPA may be performed simultaneously for a plurality of mobile station apparatuses.

Second data transmitting section 1023 performs data transmission by means of a DPCH for a mobile station apparatus for which data transmission by means of DPCH has been prescribed by control section 1025.

Other than a CQI value, values that may be used as a reception quality value of transmit signals transmitted from base station apparatuses 102-1 through 102-N are RSCP (Received Signal Code Power) that constantly indicates the transmit signal CPICH received signal power reported by mobile station apparatuses 101-1 through 101-N, or the detected value over a given period of CQI values reported by mobile station apparatuses 101-1 through 101-N.

An example of the operation of a radio communication system according to Embodiment 1 of the present invention will now be described with reference to FIG. 2 and FIG. 3.

In FIG. 3, cells 102-1S and 102-2S are covered by base station apparatuses 102-1 and 102-2 respectively. Mobile station apparatuses 101-1 and 101-2 are assumed to be located at the positions shown in the figure, and in the case of data transmission by means of HSDPA, transmission from base station apparatus 102-1 is assumed to be notified beforehand. Mobile station apparatus 101-1 is assumed to be located at the edge of cell 102-1S, and to be in the soft handover state. When mobile station apparatus 101-1 located at the edge of cell 102-1S detects a reception quality value of a transmit signal transmitted from base station apparatus 102-1 and reports that reception quality value, that reception quality value will generally be smaller than the aforementioned predetermined value.

When a reception quality value is shown to be smaller than the predetermined value in quality deficiency signal generation section 1021, base station apparatus 102-1 notifies base station control apparatus 103 that mobile station apparatus 101-1 has a quality deficiency. On receiving this notification, base station control apparatus 103 notifies base station apparatuses 102-1 and 102-2 that they should perform data transmission by means of DPCH for mobile station apparatus 101-1 instead of data transmission by means of HSDPA.

First data transmitting section 1022 of base station apparatus 102-1 excludes mobile station apparatus 101-1 from mobile station apparatuses subject to data transmission by means of HSDPA, and performs data transmission by means of HSDPA for any other mobile station apparatus, such as mobile station apparatus 101-2, for example.

Second data transmitting sections 1023 of base station apparatuses 102-1 and 102-2 perform data transmission by means of DPCH for mobile station apparatus 101-1.

Thus, in Embodiment 1 of the present invention, a base station control apparatus can exclude a mobile station apparatus thought to be located at the edge of a cell from candidates for HSDPA transmission, and therefore scheduling can be reduced for a mobile station apparatus whose throughput is likely to be low, enabling system throughput to be improved. Also, in Embodiment 1 of the present invention, the number of mobile station apparatuses requiring control can be reduced, enabling a base station apparatus to reduce the transmission power of HS-SCCH transmitted as a control signal.

Embodiment 2

Embodiment 2 of the present invention will now be described in detail with reference to the accompanying drawings.

Figure 4:
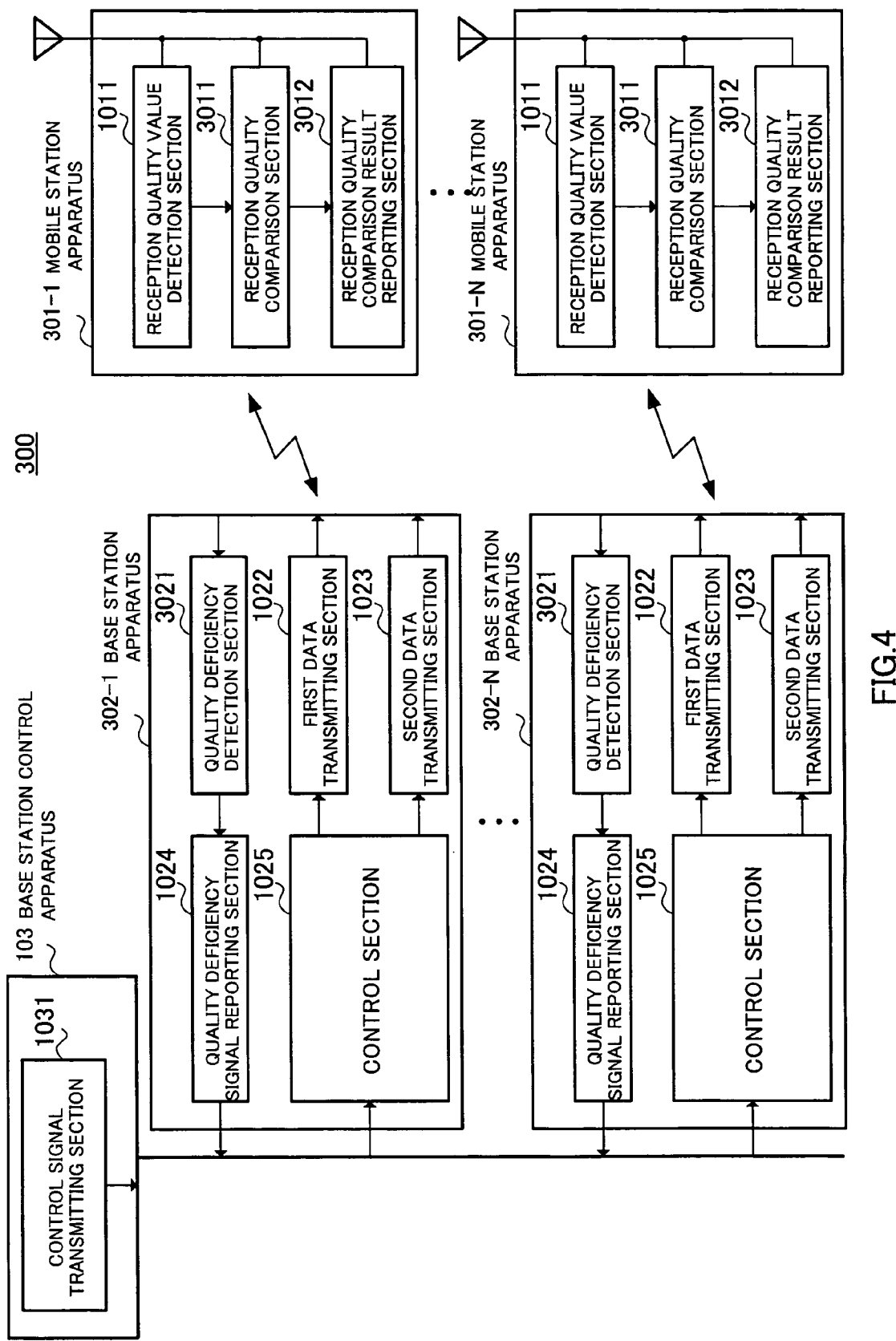
FIG. 4 is a block diagram showing the configuration of a radio communication system according to Embodiment 2 of the present invention.

FIG. 4 is a block diagram showing a radio communication system according to Embodiment 2 of the present invention. Configuration elements in Embodiment 2 of the present invention identical to those in Embodiment 1 of the invention are assigned the same reference codes as in Embodiment 1, and descriptions thereof are omitted.

As shown in FIG. 4, a radio communication system 300 according to Embodiment 2 of the present invention has a plurality of mobile station apparatuses 301-1 through 301-N, base station apparatuses 302-1 through 302-N that perform data transmission to and reception from these mobile station apparatuses 301-1 through 301-N by means of radio communication, and a base station control apparatus 103 that is connected to these base station apparatuses 302-1 through 302-N and controls these base station apparatuses 302-1 through 302-N.

Each of mobile station apparatuses 301-1 through 301-N has a reception quality value detection section 1011, a reception quality comparison section 3011, and a reception quality comparison result reporting section 3012.

The input terminal of reception quality comparison section 3011 is connected to the output terminal of reception quality value detection section 1011. The input terminal of reception quality comparison result reporting section 3012 is connected to the output terminal of reception quality comparison section 3011.

Reception quality value detection section 1011 detects a reception quality value of a transmit signal transmitted from a base station apparatus 302, and conveys this reception quality value to reception quality comparison section 3011. Reception quality comparison section 3011 compares the reception quality value from reception quality value detection section 1011 with a predetermined threshold value, generates a reception quality comparison result, and conveys this reception quality comparison result to reception quality comparison result reporting section 3012. Reception quality comparison result reporting section 3012 receives the reception quality comparison result from reception quality comparison section 3011, and reports the reception quality comparison result by means of radio communication to the base station apparatus 302-1 through 302-N from which each mobile station apparatus receives data transmission by means of HSDPA.

Each of base station apparatuses 302-1 through 302-N has a quality deficiency detection section 3021, a first data transmitting section 1022, a second data transmitting section 1023, a quality deficiency signal reporting section 1024, and a control section 1025. Control section 1025 is connected to first data transmitting section 1022 and second data transmitting section 1023. Base station control apparatus 103 has a control signal transmitting section 1031. Quality deficiency detection section 3021 detects that the reception quality value is shown to be smaller than the predetermined threshold value by the reception quality comparison result, generates a quality deficiency signal, and conveys this quality deficiency signal to quality deficiency signal reporting section 1024. In base station control apparatus 103, control signal transmitting section 1031 generates a control signal to switch the data transmission method for the mobile station apparatus corresponding to the quality deficiency signal reported from quality deficiency signal reporting section 1024 from HSDPA to DPCH, and reports this to control section 1025 of the base station apparatus 302 performing HSDPA transmission to the relevant mobile station apparatus.

Next, an actual example of the operation of a radio communication system according to Embodiment 2 of the present invention will be described. In this description, it is assumed that the base station apparatus from which mobile station apparatus 301-1 receives data transmission by means of HSDPA is base station apparatus 302-1.

Mobile station apparatus 301-1 finds the received signal power of a known signal Primary CPICH (Common Pilot Channel) constantly transmitted from base station apparatus 302-1. Base station apparatus 302-1 notifies mobile station apparatus 301-1 of the approximate transmission power (Tx-Power) of current known signal power transmission as notification information.

Mobile station apparatus 301-1 calculates the degree of power attenuation of base station apparatus 302-1 from the notification information and the RSCP (Received Signal Code Power) of the Primary CPICH. If it is not determined that this calculation result satisfies a given threshold value, mobile station apparatus 301-1 determines that the probability of assignment by HSDPA is extremely small, and sends a non-support signal whereby data transmission by means of HSDPA is temporarily not performed to base station control apparatus 103 via base station apparatus 302-1.

On receiving this non-support signal, base station control apparatus 103 recognizes that the mobile station apparatus reporting that non-support signal does not support HSDPA, eliminates that mobile station apparatus from HSDPA assignment candidates, and performs control so that data transmission is performed by means of DPCH.

On the other hand, if it is determined that the calculation result satisfies the given threshold value, mobile station apparatus 301-1 infers that data transmission by means of HSDPA can be expected and HSDPA is supported, and continues CQI value reporting.

Thus, in Embodiment 2 of the present invention, when a mobile station apparatus 301-1 through 301-N determines that high throughput cannot be expected even if it continues reporting CQI values as an HSDPA transmission candidate, it is possible to temporarily perform data transmission by means of DPCH by behavior as an HSDPA non-supporting terminal apparatus toward base station control apparatus 103. Also, by this means, a mobile station apparatus 301-1 through 301-N for which there is a low probability of high throughput assignment is eliminated from mobile station apparatuses subject to scheduling, making it possible for base station apparatuses 302-1 through 302-N to assign HSDPA only to mobile station apparatuses with good propagation path characteristics, and thereby increasing system throughput.

That is to say, in Embodiment 2 of the present invention, it is possible for a mobile station apparatus that is near a cell edge and for which the number of times that HSDPA is assigned is considered to be comparatively small, or for which it is considered more efficient to perform data transmission by means of a DPCH from a plurality of base station apparatuses by means of soft handover, to be eliminated from HSDPA-supporting mobile station apparatuses managed by the base station control apparatus, and therefore the control load can be reduced, enabling overall system throughput to be improved.

Embodiment 3

Embodiment 3 of the present invention will now be described in detail with reference to the accompanying drawings.

Figure 5:
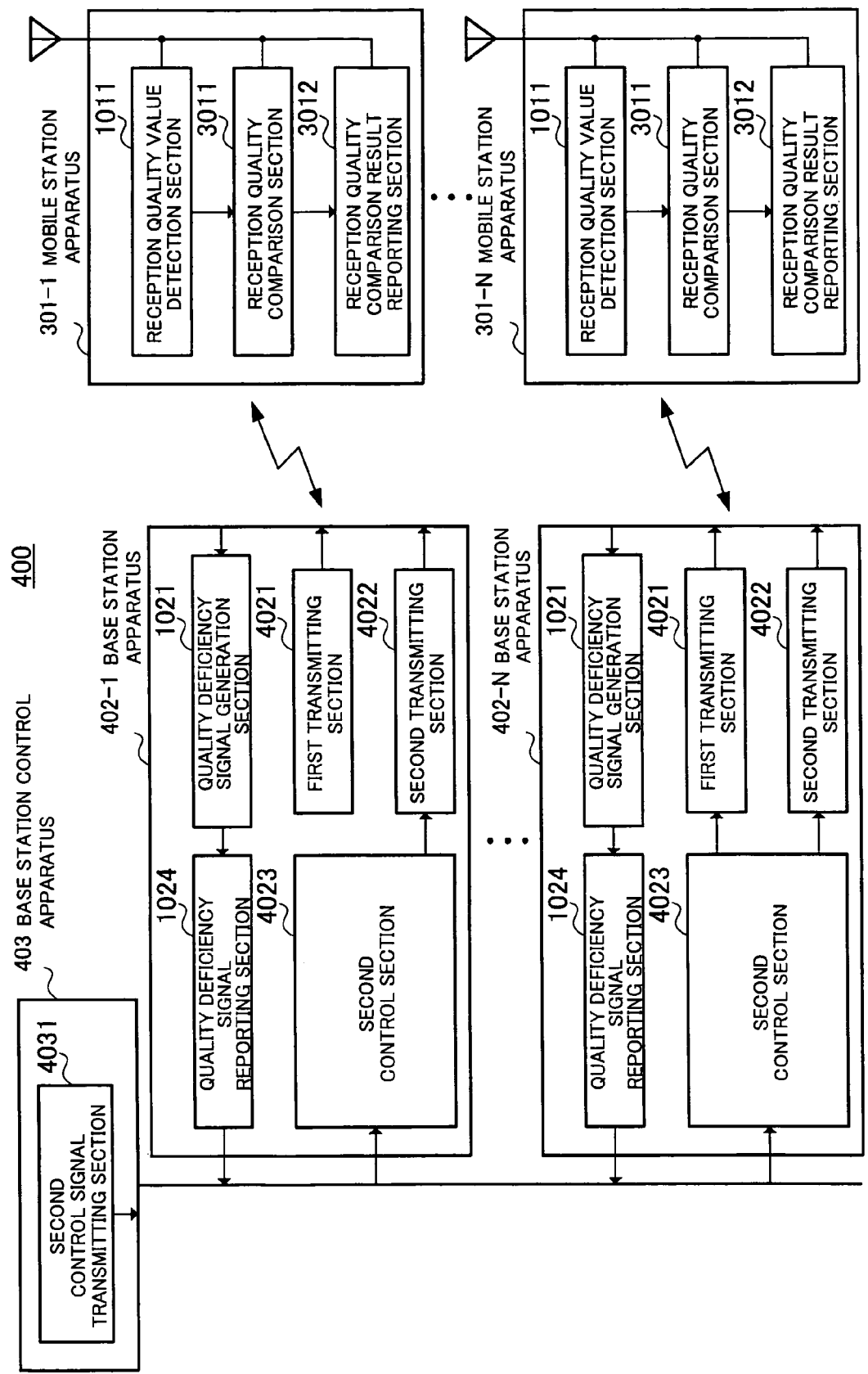
FIG. 5 is a block diagram showing the configuration of a radio communication system according to Embodiment 3 of the present invention.

FIG. 5 is a block diagram showing a radio communication system according to Embodiment 3 of the present invention. Configuration elements in Embodiment 3 of the present invention identical to those in Embodiments 1 and 2 of the invention are assigned the same reference codes as in Embodiments 1 and 2, and descriptions thereof are omitted.

As shown in FIG. 5, a radio communication system 400 according to Embodiment 3 of the present invention has a plurality of mobile station apparatuses 301-1 through 301-N, base station apparatuses 402-1 through 402-N that perform data transmission to and reception from these mobile station apparatuses 301-1 through 301-N by means of radio communication, and a base station control apparatus 403 that is connected to these base station apparatuses 402-1 through 402-N and controls these base station apparatuses 402-1 through 402-N.

Each of mobile station apparatuses 301-1 through 301-N has a reception quality value detection section 1011, a reception quality comparison section 3011, and a reception quality comparison result reporting section 3012.

Each of base station apparatuses 402-1 through 402-N has a first transmitting section 4021 and second transmitting section 4022, and a second control section 4023.

First transmitting section 4021 constantly transmits primary CPICH. In base station control apparatus 403, when many quality deficiency signals are reported from quality deficiency signal reporting section 1024, a second control signal transmitting section 4031 generates a control signal so that a signal that is the subject of a reception quality value measured by a mobile station apparatus is switched from the Primary CPICH to secondary CPICH, and reports this to mobile station apparatuses 301-1 through 301-N via second control sections 4023 in the base station apparatuses.

When notified by base station control apparatus 403 via second control section 4023, second transmitting section 4022 adds and transmits the secondary CPICH of shorter range than the primary CPICH.

Thus, in Embodiment 3 of the present invention, a mobile station apparatus far from a base station apparatus cannot receive the secondary CPICH, and therefore that mobile station apparatus can be eliminated from mobile station apparatuses subject to base station apparatus scheduling, so that the load on the scheduler can be reduced, and also HS-SCCH transmission power can be suppressed, enabling overall system throughput to be improved.

Embodiment 4

Embodiment 4 of the present invention will now be described in detail with reference to the accompanying drawings.

Figure 6:
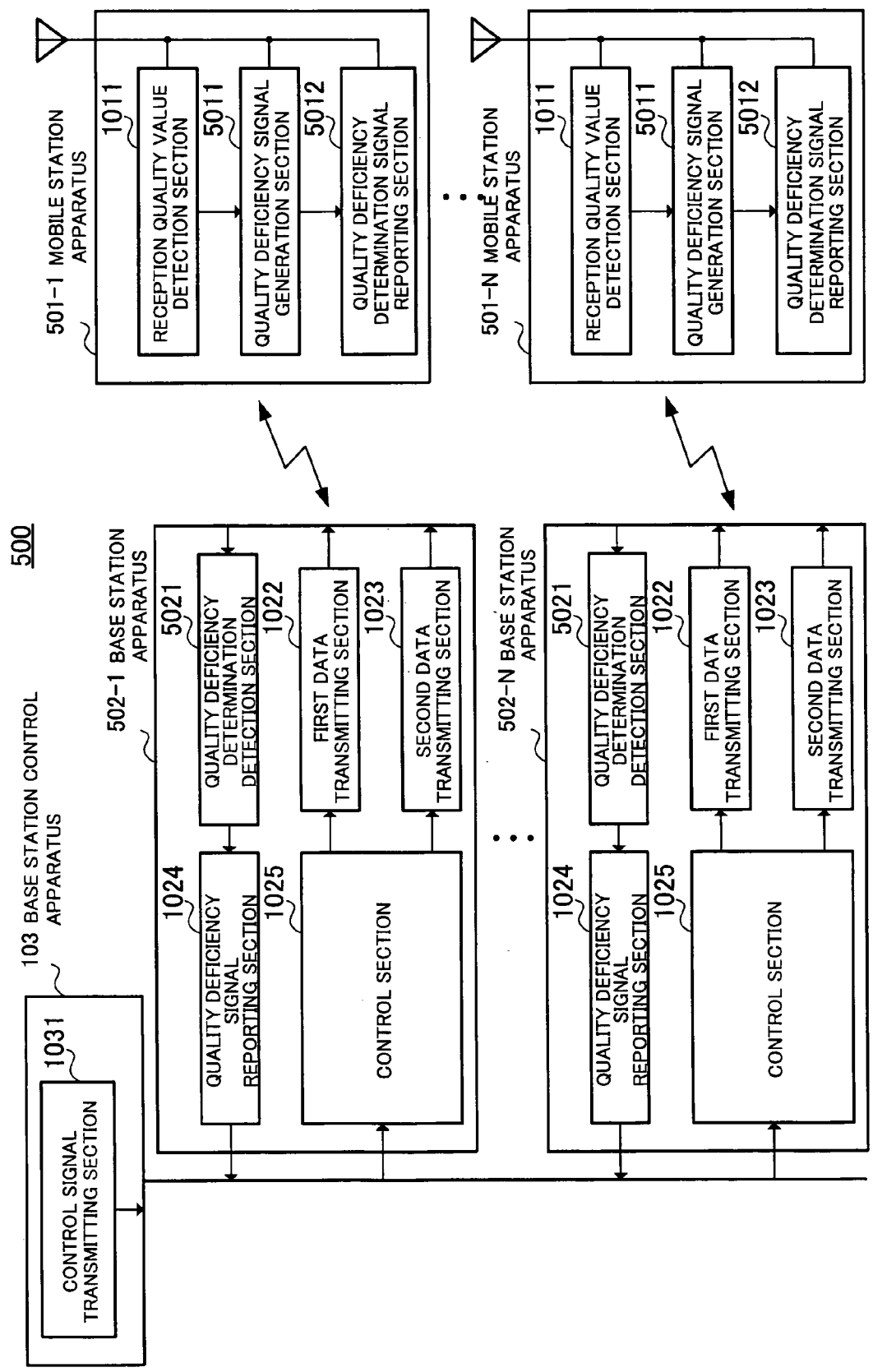
FIG. 6 is a block diagram showing the configuration of a radio communication system according to Embodiment 4 of the present invention.

FIG. 6 is a block diagram showing a radio communication system according to Embodiment 4 of the present invention. Configuration elements in Embodiment 4 of the present invention identical to those in Embodiment 1 of the invention are assigned the same reference codes as in Embodiment 1, and descriptions thereof are omitted.

As shown in FIG. 6, a radio communication system 500 according to Embodiment 4 of the present invention has a plurality of mobile station apparatuses 501-1 through 501-N, base station apparatuses 502-1 through 502-N that perform data transmission to and reception from these mobile station apparatuses 501-1 through 501-N by means of radio communication, and a base station control apparatus 103 that is connected to these base station apparatuses 502-1 through 502-N and controls these base station apparatuses 502-1 through 502-N.

Each of mobile station apparatuses 501-1 through 501-N has a reception quality value detection section 1011, a quality deficiency signal generation section 5011, and a quality deficiency determination signal reporting section 5012.

The input terminal of quality deficiency signal generation section 5011 is connected to the output terminal of reception quality value detection section 1011. The input terminal of quality deficiency determination signal reporting section 5012 is connected to the output terminal of quality deficiency signal generation section 5011.

Reception quality value detection section 1011 detects a reception quality value of a transmit signal constantly transmitted by a base station apparatus to which HSDPA is transmitted from among base station apparatuses 502-1 through 502-N, and conveys this reception quality value to quality deficiency signal generation section 5011. Quality deficiency signal generation section 5011 compares the reception quality value from reception quality value detection section 1011 with a predetermined threshold value, and if the reception quality value is smaller than the predetermined threshold value, generates a quality deficiency signal and conveys this quality deficiency signal to quality deficiency determination signal reporting section 5012. Quality deficiency determination signal reporting section 5012 receives the quality deficiency signal from quality deficiency signal generation section 5011, measures the number of quality deficiency signal generation times, which is the number of times that a quality deficiency signal is generated per unit time, and when the number of quality deficiency signal generation times is greater than or equal to a predetermined number of times, generates a quality deficiency determination signal and reports this quality deficiency determination signal by means of radio communication to the base station apparatus by which data transmission by means of HSDPA is performed.

Each of base station apparatuses 502-1 through 502-N has a first data transmitting section 1022, a second data transmitting section 1023, a quality deficiency determination detection section 5021, and a quality deficiency signal reporting section 1024.

Quality deficiency determination detection section 5021 detects the fact that the quality deficiency determination signal has been received, generates a quality deficiency signal, and reports this quality deficiency signal to base station control apparatus 103 via quality deficiency signal reporting section 1024. In base station control apparatus 103, control signal transmitting section 1031 generates a control signal to switch data transmission from HSDPA to DPCH for the mobile station apparatus corresponding to the quality deficiency signal reported from quality deficiency signal reporting section 1024, and reports this to one of base station apparatuses 502-1 through 502-N performing HSDPA transmission to the relevant mobile station apparatus.

Thus, in Embodiment 4 of the present invention, a base station control apparatus receives notification of being an HSDPA non-supporting device from a mobile station apparatus, and therefore, when there is transmitted data, transmission is performed on DPCH, and a mobile station apparatus can receive the data, and also unnecessary transmission of reception quality values can be suppressed, reducing the load on the scheduler and so enabling overall system throughput to be improved.

Embodiment 5

Embodiment 5 of the present invention will now be described in detail with reference to the accompanying drawings.

Figure 7:
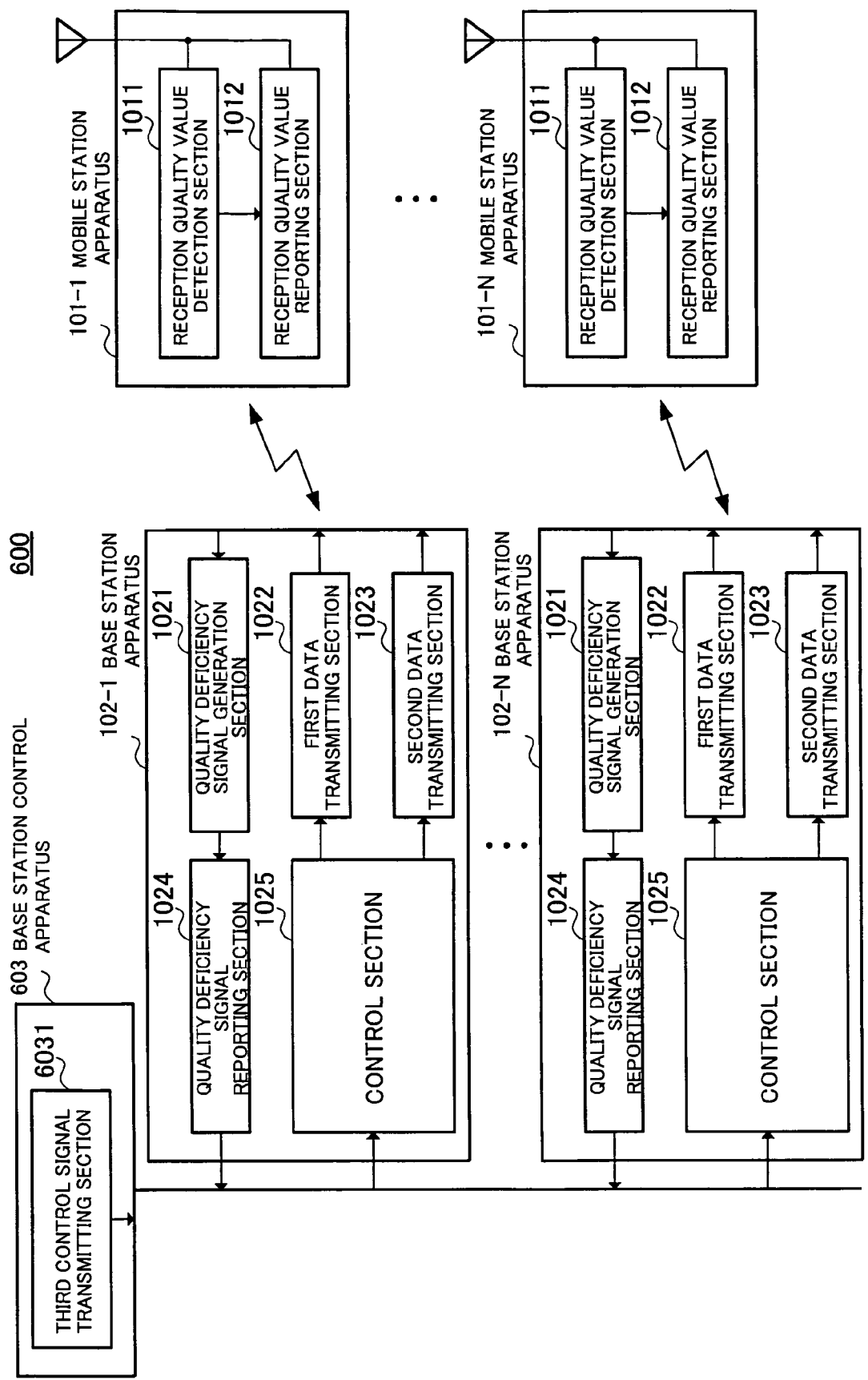
FIG. 7 is a block diagram showing the configuration of a radio communication system according to Embodiment 5 of the present invention.

FIG. 7 is a block diagram showing a radio communication system according to Embodiment 5 of the present invention. Configuration elements in Embodiment 5 of the present invention identical to those in Embodiment 1 of the invention are assigned the same reference codes as in Embodiment 1, and descriptions thereof are omitted.

As shown in FIG. 7, a radio communication system 600 according to Embodiment 5 of the present invention has a plurality of mobile station apparatuses 101-1 through 101-N, base station apparatuses 102-1 through 102-N that perform data transmission to and reception from these mobile station apparatuses 101-1 through 101-N by means of radio communication, and a base station control apparatus 603 that is connected to these base station apparatuses 102-1 through 102-N and controls these base station apparatuses 102-1 through 102-N.

Each of mobile station apparatuses 101-1 through 101-N has a reception quality value detection section 1011 and a reception quality value reporting section 1012. The input terminal of reception quality value reporting section 1012 is connected to the output terminal of reception quality value detection section 1011.

Each of base station apparatuses 102-1 through 102-N has a control section 1025, a quality deficiency signal generation section 1021, a quality deficiency signal reporting section 1024, and a first data transmitting section 1022 and second data transmitting section 1023. Control section 1025 is connected to quality deficiency signal generation section 1021, quality deficiency signal reporting section 1024, and first data transmitting section 1022 and second data transmitting section 1023. The input terminal of quality deficiency signal reporting section 1024 is connected to the output terminal of quality deficiency signal generation section 1021. Base station control apparatus 603 has a third control signal transmitting section 6031.

In each of mobile station apparatuses 101-1 through 101-N, reception quality value detection section 1011 detects a reception quality value of a transmit signal transmitted from a base station apparatus 102-1 through 102-N, and conveys this reception quality value to reception quality value reporting section 1012. Reception quality value reporting section 1012 receives the reception quality value from reception quality value detection section 1011 and reports this by radio communication to a measured base station apparatus 102-1 through 102-N.

In each of base station apparatuses 102-1 through 102-N, quality deficiency signal generation section 1021 compares the reception quality value from reception quality value reporting section 1012 with a predetermined threshold value, and if the reception quality value is smaller than the predetermined threshold value, generates a quality deficiency signal and conveys this quality deficiency signal to quality deficiency signal reporting section 1024. Quality deficiency signal reporting section 1024 reports the quality deficiency signal from quality deficiency signal generation section 1021 to base station control apparatus 603.

Third control signal transmitting section 6031 of base station control apparatus 603 receives the quality deficiency signal from quality deficiency signal reporting section 1024, measures the number of quality deficiency signal generation times, which is the number of times that a quality deficiency signal is generated per unit time, and when the number of quality deficiency signal generation times is greater than or equal to a predetermined number of times, generates a control signal to switch data transmission by means of HSDPA of the corresponding mobile station apparatus to DPCH, and reports this control signal to base station apparatuses 102-1 through 102-N.

In each of base station apparatuses 102-1 through 102-N, when a control signal is not received from third control signal transmitting section 6031, control section 1025 performs data transmission by means of HSDPA for corresponding mobile station apparatus 101-1 through 101-N.

Also, in each of base station apparatuses 102-1 through 102-N, when a control signal is received from third control signal transmitting section 6031, control section 1025 performs data transmission by means of DPCH for corresponding mobile station apparatus 101-1 through 101-N.

Thus, in Embodiment 5 of the present invention, a base station control apparatus can identify a mobile station apparatus for which the efficiency of data transmission by means of HSDPA is poor, and can therefore perform control to temporarily switch to data transmission by means of DPCH instead of data transmission by means of HSDPA for that mobile station apparatus, enabling overall system throughput to be improved.

Embodiment 6

Embodiment 6 of the present invention will now be described in detail with reference to the accompanying drawings.

Figure 8:
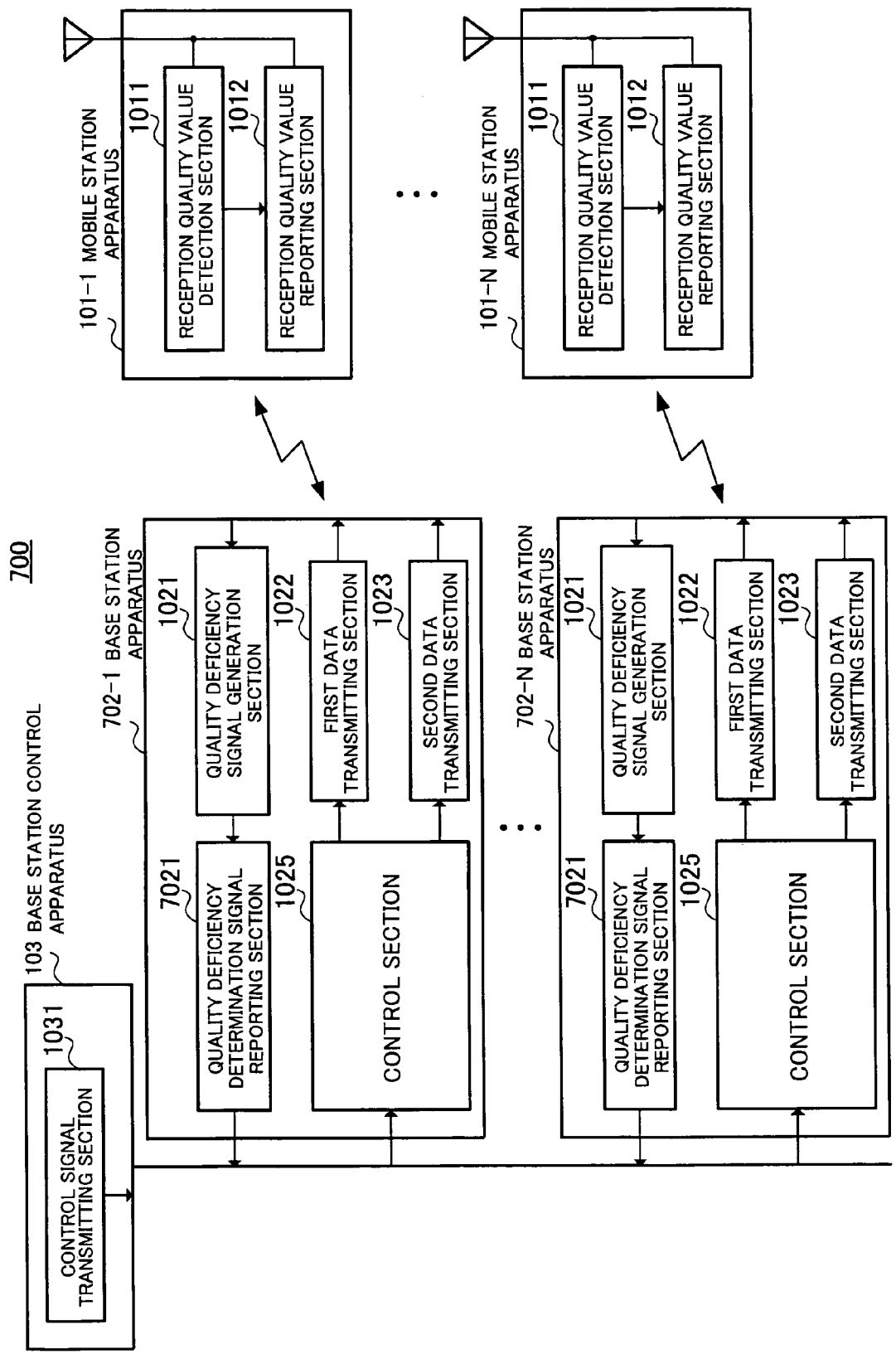
FIG. 8 is a block diagram showing the configuration of a radio communication system according to Embodiment 6 of the present invention.

FIG. 8 is a block diagram showing a radio communication system according to Embodiment 6 of the present invention. Configuration elements in Embodiment 6 of the present invention identical to those in Embodiment 1 of the invention are assigned the same reference codes as in Embodiment 1, and descriptions thereof are omitted.

As shown in FIG. 8, a radio communication system 700 according to Embodiment 6 of the present invention has a plurality of mobile station apparatuses 101-1 through 101-N, base station apparatuses 702-1 through 702-N that perform data transmission to and reception from these mobile station apparatuses 101-1 through 101-N by means of radio communication, and a base station control apparatus 103 that is connected to these base station apparatuses 702-1 through 702-N and controls these base station apparatuses 702-1 through 702-N.

Each of mobile station apparatuses 101-1 through 101-N has a reception quality value detection section 1011 and a reception quality value reporting section 1012. The input terminal of reception quality value reporting section 1012 is connected to the output terminal of reception quality value detection section 1011.

Each of base station apparatuses 702-1 through 702-N has a control section 1025, a quality deficiency signal generation section 1021, a quality deficiency determination signal reporting section 7021, and a first data transmitting section 1022 and second data transmitting section 1023. Control section 1025 is connected to first data transmitting section 1022 and second data transmitting section 1023. The input terminal of quality deficiency determination signal reporting section 7021 is connected to the output terminal of quality deficiency signal generation section 1021. Base station control apparatus 103 has a control signal transmitting section 1031.

In each of mobile station apparatuses 101-1 through 101-N, reception quality value detection section 1011 detects a reception quality value of a transmit signal transmitted from a base station apparatus that receives data transmission by means of HSDPA from among base station apparatuses 702-1 through 702-N, and conveys this reception quality value to reception quality value reporting section 1012. Reception quality value reporting section 1012 receives the reception quality value from reception quality value detection section 1011 and reports this by radio communication to base station apparatuses 702-1 through 702-N.

In each of base station apparatuses 702-1 through 702-N, quality deficiency signal generation section 1021 compares the reception quality value from reception quality value reporting section 1012 with a predetermined threshold value, and if the reception quality value is smaller than the predetermined threshold value, generates a quality deficiency signal and conveys this quality deficiency signal to quality deficiency determination signal reporting section 7021. Quality deficiency determination signal reporting section 7021 receives the quality deficiency signal from quality deficiency signal generation section 1021, measures the number of quality deficiency signal generation times, which is the number of times that a quality deficiency signal is generated per unit time, and when the number of quality deficiency signal generation times is greater than or equal to a predetermined number of times, generates a quality deficiency determination signal, and reports that quality deficiency determination signal to base station control apparatus 103.

In base station control apparatus 103, when the quality deficiency determination signal from quality deficiency determination signal reporting section 7021 is received, control signal transmitting section 1031 generates a control signal to switch the data transmission method for the relevant mobile station apparatus from HSDPA to DPCH, and transmits this control signal to control section 1025.

Thus, in Embodiment 6 of the present invention, a base station control apparatus recognizes that HSDPA cannot be assigned to a mobile station apparatus, and can therefore switch data transmission to DPCH, enabling overall system throughput to be improved.

As described above, according to the present invention, overall system throughput can be improved by controlling HSDPA assignment for a plurality of mobile station apparatuses.

This application is based on Japanese Patent Application No. 2003-122544 filed on Apr. 25, 2003, the entire content of which is expressly incorporated by reference herein.

The present invention is applicable to a radio apparatus installed in a mobile station apparatus, base station apparatus, etc., in a mobile communication system.

The invention claimed is:

1. A communication system having a base station apparatus that is controlled by a base station control apparatus and that performs data transmission to and reception from a mobile station apparatus by way of a high speed downlink packet access mode or a dedicated downlink physical channel mode, said communication system comprising:

said base station apparatus, which comprises:
a first data transmission section that performs data transmission by way of said high speed downlink packet access mode;
a second data transmission section that performs data transmission by way of said dedicated downlink physical channel mode;
a quality deficiency signal generation section that generates a quality deficiency signal when reception quality at the mobile station apparatus that performs data transmission by way of said high speed downlink packet access mode is lower than a predetermined threshold value;
a quality deficiency signal reporting section that reports the quality deficiency signal to the base station control apparatus; and
a control section that controls the first data transmission section and the second data transmission section to perform data transmission by way of a transmission scheme determined by said base station control apparatus based on the quality deficiency signal, and said base station control apparatus comprises a control signal transmission section that transmits a control signal to the base station apparatus so that when the number of times said quality deficiency signal is reported per unit time is greater than a predetermined number of times, data transmission for the mobile station apparatus is switched from the high speed downlink packet access mode to the dedicated downlink physical channel mode.

2. A communication system having a base station apparatus that is controlled by a base station control apparatus and that performs data transmission to and reception from a mobile station apparatus by way of a high speed downlink packet access mode or a dedicated downlink physical channel mode, said communication system comprising:

said base station apparatus, which comprises:
- a first data transmission section that performs data transmission by way of said high speed downlink packet access mode;
- a second data transmission section that performs data transmission by way of said dedicated downlink physical channel mode;
- a quality deficiency signal generation section that generates a quality deficiency signal when reception quality at the mobile station apparatus that performs data transmission by way of said high speed downlink packet access mode is lower than a predetermined threshold value;
- a quality deficiency signal reporting section that reports the quality deficiency signal to the base station control apparatus when the number of times said quality deficiency signal is generated per unit time is greater than or equal to a predetermined number of times; and
- a control section that controls the first data transmission section and the second data transmission section to perform data transmission by way of a transmission scheme determined by said base station control apparatus based on the quality deficiency signal, and said base station control apparatus comprises a control signal transmission section that transmits a control signal to the base station apparatus so that when the number of times said quality deficiency signal is reported per unit time is greater than the predetermined number of times, data transmission for the mobile station apparatus is switched from the high speed downlink packet access mode to the dedicated downlink physical channel mode.

3. A communication system having a base station apparatus that is controlled by a base station control apparatus and that performs data transmission to and reception from a mobile station apparatus by way of a high speed downlink packet access mode or a dedicated downlink physical channel mode, said communication system comprising:

said base station apparatus, which comprises:
- a first data transmission section that performs data transmission by way of said high speed downlink packet access mode;
- a second data transmission section that performs data transmission by way of said dedicated downlink physical channel mode;
- a quality deficiency detection section that receives a signal representing a comparison result of reception quality at the mobile station apparatus that performs data transmission by way of said high speed downlink packet access mode and a predetermined threshold value, detects that the reception quality is lower than the predetermined threshold value and generates a quality deficiency signal;
- a quality deficiency signal reporting section that reports the quality deficiency signal to the base station control apparatus; and
- a control section that controls the first data transmission section and the second data transmission section to perform data transmission by way of a transmission scheme determined by said base station control apparatus based on the quality deficiency signal, and said base station control apparatus comprises a control signal transmission section that transmits a control signal to the base station apparatus so that when the number of times said quality deficiency signal is reported per unit time is greater than a predetermined number of times, data transmission for the mobile station apparatus is switched from the high speed downlink packet access mode to the dedicated downlink physical channel mode.

* * * * *